United States Patent
Boariu et al.

(10) Patent No.: US 9,698,956 B2
(45) Date of Patent: *Jul. 4, 2017

(54) MOBILE STATION AGGREGATION OF ACKNOWLEDGMENTS AND NEGATIVE ACKNOWLEDGMENTS IN WIRELESS NETWORKS

(71) Applicant: WIRELESS FUTURE TECHNOLOGIES INC., Ottawa (CA)

(72) Inventors: Adrian Boariu, Irving, TX (US); Shashikant Maheshwari, Irving, TX (US)

(73) Assignee: WIRELESS FUTURE TECHNOLOGIES INC., Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/095,797

(22) Filed: Apr. 11, 2016

(65) Prior Publication Data

US 2016/0226646 A1 Aug. 4, 2016

Related U.S. Application Data

(63) Continuation of application No. 12/671,149, filed as application No. PCT/US2008/071989 on Aug. 1, 2008, now Pat. No. 9,313,796.

(Continued)

(51) Int. Cl.
*H04L 5/00* (2006.01)
*H04L 1/16* (2006.01)
(Continued)

(52) U.S. Cl.
CPC .......... *H04L 5/0055* (2013.01); *H04L 1/1614* (2013.01); *H04L 1/1825* (2013.01);
(Continued)

(58) Field of Classification Search
None
See application file for complete search history.

(56) References Cited

U.S. PATENT DOCUMENTS

| 6,947,408 B1 | 9/2005 | Liberti et al. |
| 7,020,110 B2 | 3/2006 | Walton et al. |

(Continued)

FOREIGN PATENT DOCUMENTS

| RU | 2004111973 | 10/2005 |
| WO | 2009/020876 | 2/2009 |

OTHER PUBLICATIONS

IEEE C802.16maint-05/061; IEEE 802.16 Broadband Wireless Access Working Group http://ieee802.org/16>; Clarification on the UL ACK Channel, Jan. 24, 2005.
(Continued)

*Primary Examiner* — Diane Lo
(74) *Attorney, Agent, or Firm* — Volpe and Koenig, P.C.

(57) ABSTRACT

Various example embodiments are disclosed herein. According to one example embodiment, a method may include determining, at a base station in a wireless network, an uplink channel quality for a mobile station, sending an acknowledgment/negative acknowledgment (ACK/NAK) aggregation indicator to the mobile station based on the determining, sending a plurality of data bursts to the mobile station, and receiving at least one aggregated ACK/NAK report from the mobile station.

6 Claims, 6 Drawing Sheets

Related U.S. Application Data

(60) Provisional application No. 60/953,867, filed on Aug. 3, 2007.

(51) Int. Cl.
 *H04L 1/18* (2006.01)
 *H04W 72/04* (2009.01)
 *H04W 72/08* (2009.01)

(52) U.S. Cl.
 CPC ..... *H04W 72/0413* (2013.01); *H04W 72/085* (2013.01); *H04W 72/0406* (2013.01)

(56) References Cited

U.S. PATENT DOCUMENTS

| | | | |
|---|---|---|---|
| 7,155,236 | B2 | 12/2006 | Chen et al. |
| 7,701,975 | B1 | 4/2010 | Tsang et al. |
| 2004/0162083 | A1 | 8/2004 | Chen et al. |
| 2005/0096063 | A1 | 5/2005 | Muniere |
| 2005/0163058 | A1* | 7/2005 | Nabetani ............... H04L 47/10 370/252 |
| 2005/0204247 | A1 | 9/2005 | Guo et al. |
| 2005/0270975 | A1* | 12/2005 | Meylan ............... H04L 47/14 370/229 |
| 2006/0104300 | A1* | 5/2006 | Ho ....................... H04L 1/0083 370/428 |
| 2006/0146705 | A1 | 7/2006 | Waxman |

OTHER PUBLICATIONS

International Search Report and Written Opinion for International Application Serial No. PCT/US2008/071989, mailed Oct. 22, 2008, 14 pages.

Cudak, Mark, "Draft IEEE 802.16m Requirements," IEEE 802.16 Broadband Wireless Access Working Group, IEEE C802.16m-07/002r1 (Mar. 15, 2007), 34 pages.

IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Std 802.16e-2005 and IEEE Std 802.16-2004/Cor1-2005 (Feb. 28, 2006), 863 pages.

IEEE Standard for Local and metropolitan area networks; Part 16: Air Interface for Broadband Wireless Access Systems, IEEE Std. 802.16-2004 (Oct. 1, 2004) 893 pages.

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.1.0 (Jun. 2007).

Third Generation Partnership Project, "Technical Specification Group Radio Access Network; Physical layer procedures (Release 8)," 3GPP TS 36.213 V1.2.0 (May 2007).

Third Generation Partnership Project, "Technical Specification Group Radio Access Network; Multiplexing and channel coding (Release 8)," 3GPP TS 36.212 V1.3.0 (Jul. 2007).

IEEE Std. 802.11-2007 (Revision of IEEE Std. 802.11-1999); IEEE Standard for Information Technology—Telecommunications and information exchange between systems—Local and metropolitan area networks—Specific requirements; Part 11: Wireless LAN Medium Access Control (MAC) and Physical Layer (PHY) Specifications:;IEEE Computer Society; Sponsored by the LAN/MAN Standards Committee; IEEE; 3 Park Avenue, New York, NY 10016-5997, USA, pp. 1-1232 (Jun. 12, 2007).

IEEE C802.16e-05/23r5; IEEE 802.16 Broadband Wireless Access Working Group <http://ieee802.org/16>; Normal MAP Extension for H-ARQ, Jan. 25, 2005.

* cited by examiner

MOBILE STATION AGGREGATION OF ACKNOWLEDGMENTS AND NEGATIVE ACKNOWLEDGMENTS IN WIRELESS NETWORKS

CROSS REFERENCE TO RELATED APPLICATIONS

This application is a continuation of U.S. patent application Ser. No. 12/671,149, filed Sep. 7, 2010, which is a National Stage application of PCT/US2008/071989, filed Aug. 1, 2008, which claims the benefit of U.S. Provisional Patent Application No. 60/953,867, filed Aug. 3, 2007, which are incorporated by reference as if fully set forth.

FIELD OF INVENTION

This description relates to wireless networks.

BACKGROUND

In wireless networks, a base station may transmit data bursts to one or more mobile stations. The mobile stations may transmit acknowledgments (ACKs) or negative acknowledgments (NAKs) to the base station to indicate whether each of the data bursts were successfully received.

SUMMARY

According to one general aspect, a method may include determining, at a base station in a wireless network, an uplink channel quality for a mobile station, sending an acknowledgment/negative acknowledgment (ACK/NAK) aggregation indicator to the mobile station based on the determining, sending a plurality of data bursts to the mobile station, and receiving at least one aggregated ACK/NAK report from the mobile station.

According to another general aspect, a method may include receiving, from a base station in a wireless network, an acknowledgment/negative acknowledgment (ACK/NAK) aggregation indicator, determining whether each of a plurality of data bursts was successfully received from the base station, and sending at least one aggregated ACK/NAK report to the base station. The at least one aggregated ACK/NAK report may indicate whether each of a number of the plurality of data bursts was successfully received. A number of ACK/NAKs aggregated into the at least one aggregated ACK/NAK report may be based on the ACK/NAK aggregation indicator.

According to another general aspect, an apparatus may include a controller. The apparatus may be configured to determine, at a base station in a wireless network, an uplink channel quality for a mobile station, to send an acknowledgment/negative acknowledgment (ACK/NAK) aggregation indicator to the mobile station based on the determining, to send a plurality of data bursts to the mobile station, and to receive at least one aggregated ACK/NAK report from the mobile station.

According to another general aspect, an apparatus may include a controller. The apparatus may be configured to receive, from a base station in a wireless network, an acknowledgment/negative acknowledgment (ACK/NAK) aggregation indicator, to determine whether each of a plurality of data bursts was successfully received from the base station, and to send at least one aggregated ACK/NAK report to the base station. The at least one aggregated ACK/NAK report may indicate whether each of a number of the plurality of data bursts, for which a corresponding number of ACK/NAKs were aggregated into the at least one aggregated ACK/NAK report, was successfully received.

According to another general aspect, a computer readable storage medium may comprise executable code stored thereon that, when executed by a processor, causes an apparatus to at least determine, in a wireless network, an uplink channel quality for a mobile station, send an acknowledgment/negative acknowledgment (ACK/NAK) aggregation indicator to the mobile station based on the determining, send a plurality of data bursts to the mobile station, and receive at least one aggregated ACK/NAK report from the mobile station.

According to another general aspect, a computer readable storage medium may comprise executable code stored thereon that, when executed by a processor, causes an apparatus to at least receive, from a base station in a wireless network, an acknowledgment/negative acknowledgment (ACK/NAK) aggregation indicator, determine whether each of a plurality of data bursts was successfully received from the base station, and send at least one aggregated ACK/NAK report to the base station based on the determining, the at least one aggregated ACK/NAK report indicating whether each of a plurality of data bursts, for which a corresponding number of ACK/NAKs were aggregated into the at least one aggregated ACK/NAK report, was successfully received.

The details of one or more implementations are set forth in the accompanying drawings and the description below. Other features will be apparent from the description and drawings, and from the claims.

DETAILED DESCRIPTION OF THE PREFERRED EMBODIMENTS

Figure 1:
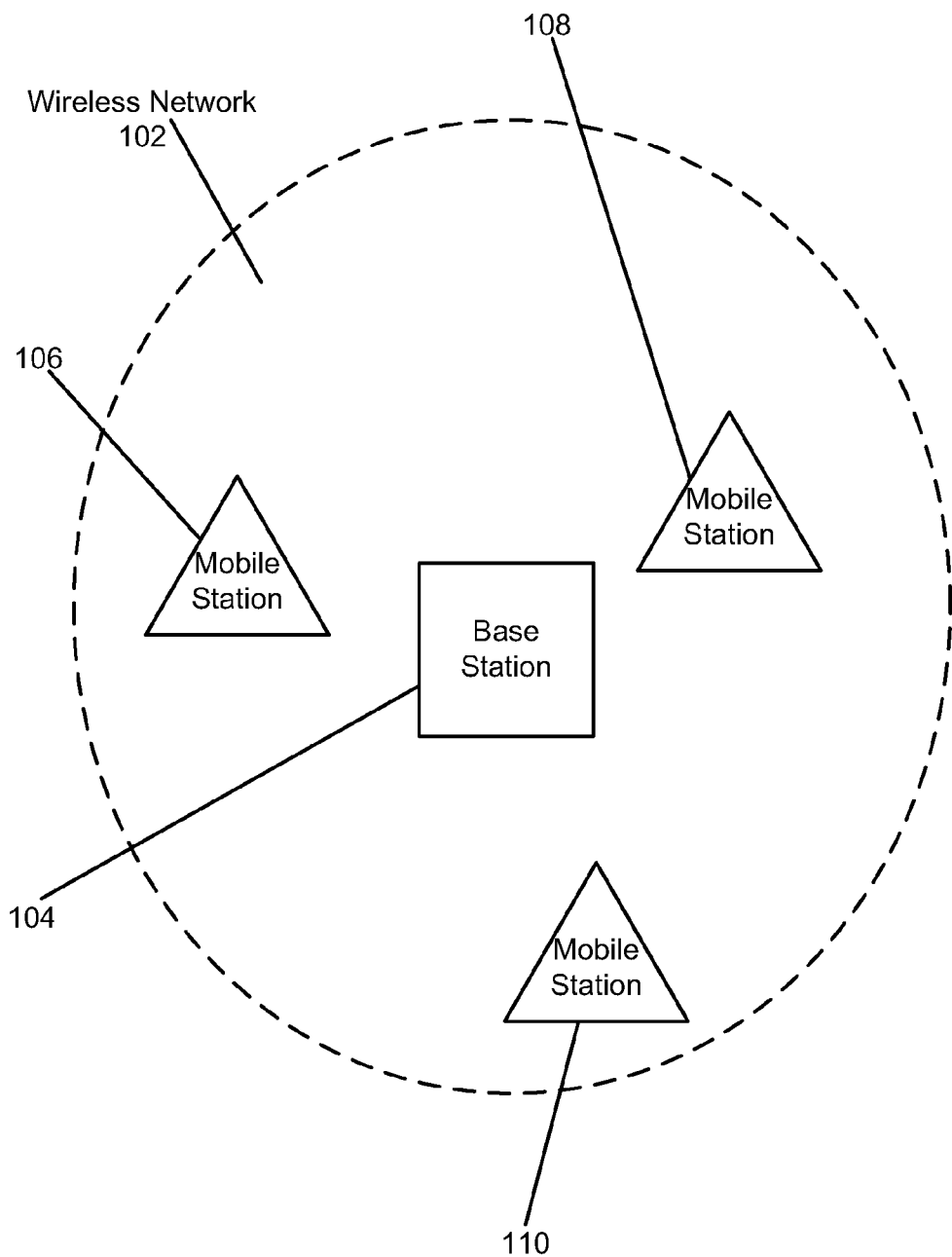
FIG. 1 is a block diagram of wireless network including a base station and a plurality of mobile stations according to an example embodiment.

FIG. 1 is a block diagram of wireless network 102 including a base station 104 and a plurality of mobile stations 106, 108, 110 according to an example embodiment. The wireless network 102 may, for example, include an IEEE 802.11 wireless local area network (WLAN), an IEEE 802.16 wireless local metropolitan area network (WiMAX), or a cellular telephone network. The base station 104 may include a WiMAX base station, cellular base station, node B, or WLAN access point, according to example embodiments. The mobile stations 106, 108, 110 may include laptop computers, personal digital assistants (PDAs), smartphones, cellular telephones, or relay stations according to example embodiments. The base station 104 may send information to the mobile stations 106, 108, 110 by transmitting data bursts to one or more of the mobile stations 106, 108, 110. Error control mechanisms may be used to detect and correct errors that occur in the transmission of data bursts to the mobile stations 106, 108, 110. While the present disclosure utilizes the terminology of WiMAX, aspects of the present disclosure may be applicable to other wired or wireless technologies.

According to one hybrid automatic repeat request (HARQ) error control mechanism, the base station 104 may transmit a predetermined number, such as one or more, data bursts to each mobile station 106, 108, 110 over a predetermined time interval. The data bursts may each have been sent along a single channel, which may have been communicated to the mobile stations 106, 108, 110 in advance. For example, the base station 104 may have sent a HARQ map to the mobile stations 106, 108, 110, which may include a transmission schedule of the data bursts including channel information for the data bursts, as well as channel information for acknowledgments (ACKs) or negative acknowledgments (NAKs) to be sent in response to each of the data bursts. The transmission schedule may indicate the predetermined time interval over which the data bursts may be sent, or the predetermined time interval may be calculated based on the transmission schedule. In one example embodiment, each data burst may include a cyclic redundancy code (CRC) which may be used for error correction and/or detection. In another example, each data burst may include a number of data blocks. In this latter example, each data block within the data burst may include a CRC.

After the predetermined time interval has elapsed, the mobile stations 106, 108, 110, may send an ACK or NAK to the base station 104. In the example in which each data burst includes one CRC, the mobile stations 106, 108, 110 may send one ACK or NAK to the base station 104 for each data burst. In the example in which each data burst includes a number of data blocks, each data block including a CRC, the mobile stations 106, 108, 110 may send one ACK or NAK to the base station 104 for each data burst or CRC.

The mobile stations 106, 108, 110 may send the ACK or NAK to the base station 104 after a specified delay period has expired after the sending of the data burst to which the ACK or NAK corresponds. According to this example, each ACK or NAK may be sent to the base station 104 via a single channel. The channel may include a frequency, a time duration, and/or a code. Sending each ACK or NAK via a single channel may be an inefficient use of resources.

In another example embodiment, each mobile station 106, 108, 110 may aggregate some or all of the ACKs or NAKs corresponding to the data bursts scheduled in the HARQ map into aggregated ACK/NAK channels. The number of individual ACK/NAKs that are aggregated into a single aggregated ACK/NAK channel may be determined by the ACK/NAK aggregation indicator, which may be agreed upon between the base station 104 and each individual mobile station 106, 108, 110. This may use the channel resources more efficiently than sending each ACK or NAK via its own channel; however, in some situations, such as where the uplink channel quality is poor, transmission errors in a single channel may cause the loss of a number of ACKs or NAKs, requiring the base station 104 to retransmit all of the data bursts corresponding to the lost ACKs or NAKs.

According to another example embodiment, the ACKs and/or NAKs may be dynamically aggregated based on the uplink channel quality. For example, the base station 104 may determine the uplink channel quality for each mobile station 106, 108, 110. According to one example, three ACKs and/or NAKs may be aggregated when the uplink channel quality is "high," two may be aggregated when the uplink channel quality is "medium," and each ACK or NAK may be sent separately when the uplink channel quality is medium.

The uplink channel quality may be determined, for example, based on a determined distance between the mobile station 106, 108, 110 and the base station 104, based on a received signal strength along an uplink ACK/NAK channel for the mobile station 106, 108, 110 or based on the transmission power of signals sent from the mobile stations 106, 108, 110. The uplink channel quality, such as the determined distance or received signal strength, may be based, for example, on one or more signals received from each mobile station 106, 108, 110. The received signals may, for example, include information such as the transmission strength, which may be based on the mobile station's 106, 108, 110 determination of the distance from the base station 104 or the channel quality. The channel quality may also be determined based on a channel quality indicator received from the mobile station 106, 108, 110, for example.

Based on the determined uplink channel quality, the base station 104 may send to one or more of the mobile stations 106, 108, 110 an acknowledgment/negative acknowledgment (ACK/NAK) aggregation indicator. The ACK/NAK aggregation indicator may, for example, either be included dynamically in a transmission schedule or HARQ map, or may be included statically/semi-statically by sending a message to one or more of the mobile stations 106, 108, 110. The transmission schedule may, for example, include a MAP (medium access protocol) information element, with information regarding which mobile station(s) will receive data bursts, and how the data bursts should be demodulated and/or decoded.

For example, the ACK/NAK aggregation indicator may be included in an information element for each mobile station 106, 108, 110. One example may include a single information element for each mobile station 106, 108, 110 which will receive data according to the transmission schedule, with each information element including information (such as the ACK/NAK aggregation indicator) applicable to multiple data bursts which will be sent to the mobile station 106, 108, 110. In an example which uses chase combining to combine multiple information elements in a single transmission schedule or downlink HARQ chase burst element, the ACK/NAK aggregation indicator or information element for each mobile station 106, 108, 110 may be included in the single transmission schedule or downlink HARQ chase burst element. The transmission schedule may be included in a frame which also includes one or more of the scheduled data bursts; a transmission schedule with an ACK/NAK aggregation indicator for each mobile station 106, 108, 110 may be included in each frame sent by the base station 104, according to an example embodiment. In another example embodiment, the base station 104 may broadcast the ACK/NAK aggregation indicator to the mobile stations 106, 108, 110 separately from the transmission schedule or HARQ map.

The transmission schedule may, for example, include a schedule of data bursts which will be sent by the base station 104 to each of the mobile stations 106, 108, 110, and may include channel information for each of the data bursts. The ACK/NAK aggregation indicator may indicate a number of data bursts which are to be acknowledged or negatively acknowledged in each ACK channel. This number may be the same or different for each mobile station 106, 108, 110, according to example embodiments. The ACK/NAK aggregation indicator may also, for example, include channel information for the channel(s) via which the aggregated ACK/NAKs are to be sent. The mobile stations 106, 108, 110 may each receive the ACK/NAK aggregation indicator.

The channel via which the aggregated ACK/NAKs are sent may include, for example, an uplink (UL) ACK channel. A full UL ACK channel may include three tiles; within each tile, one or more of the specially constructed signals may be transmitted. For example, the number of specially constructed signals can be eight, thus creating an 8-ary codeword alphabet, each codeword (signal) being addressed as an index running from zero to seven. A tile combination vector may include one or more tiles, according to an example embodiment.

Base station 104 may send the ACK/NAK aggregation indicator to one or more of the mobile stations 106, 108, 110. The base station 104 may also send a plurality of data bursts to each of the mobile stations 106, 108, 110 (the base station 104 may also send an uplink transmission schedule to the mobile stations 106, 108, 110 after sending the transmission schedule which includes the ACK/NAK aggregation indicator and sending the data bursts, and the data bursts sent by the base station 104 may be followed by data bursts sent in the uplink direction from the mobile stations 106, 108, 110 to the base station). The data bursts sent by the base station 104 may include MAC (medium access protocol) packet data units (MPDUs), according to an example embodiment. The data bursts may, for example, have been sent in accordance with the transmission schedule.

The mobile stations 106, 108, 110 may determine whether each of the plurality of data bursts scheduled for them were successfully received from the base station 104. The mobile stations 106, 108, 110 may determine whether the data bursts were successfully received by, for example, determining whether the data bursts were received at all via the scheduled channel, by determining whether data included in the data bursts conforms to forward error correction coding or cyclic redundancy coding schemes, or other error detection methods.

The mobile stations 106, 108, 110 may each send one or more aggregated ACK/NAK reports to the base station 104. An aggregated ACK/NAK report may be sent via a single channel, such as an UL ACK channel. The aggregated ACK/NAK reports may each indicate whether a number of data bursts were successfully received or not successfully received based on the determination of whether each of the plurality of data bursts were successfully received. The number of ACKs and/or NAKs in each aggregated ACK/NAK report may be based on the ACK/NAK aggregation indicator. For example, if the ACK/NAK aggregated indicator indicates that mobile station 106 should aggregate three ACKs and/or NAKs into a single channel (such as the UL ACK channel), then each aggregated ACK/NAK report sent by mobile station 106 may include three ACKs and/or NAKs. If the number of data bursts sent or intended to be sent to mobile node 106 is not a multiple of three (or other aggregation number), then the last aggregated ACK/NAK report may include the remainder of the ACKs and/or NAKs to be sent by the mobile station 106 to the base station 104, according to an example embodiment. According to another example embodiment, an aggregated ACK/NAK report other than the last aggregated ACK/NAK report, such as the first or a middle aggregated ACK/NAK report, may include a remainder of ACKs and/or NAKs.

According to an example embodiment, such as one in which the aggregated ACK/NAK is sent via an UL ACK/NAK channel, the aggregated ACK/NAK may include a tile combination vector. According to one example, the channel via which the aggregated ACK/NAK is transmitted may include three pieces of a 3×3 uplink tile or three pieces of a 4×3 uplink tile. The ACK/NAK bits indicating whether each data burst was successfully received may, for example, be encoded into a length-three codeword over an 8-ary alphabet. In an example embodiment in which three ACKs and/or NAKs are aggregated into each aggregated ACK/NAK, the aggregated ACK/NAKs may be encoded as shown in the following table in which an ACK is represented by a "1" and a NAK is represented by a "0":

| Aggregated ACKs and/or NAKs (3 bit reporting) 1 2 3 (bit position) | Vector Indices per Tile Tile (0), Tile (1), Tile (2) |
|---|---|
| 1 1 1 | 0 0 0 |
| 1 1 0 | 1 1 1 |
| 1 0 1 | 2 2 2 |
| 1 0 0 | 3 3 3 |
| 0 1 1 | 4 4 4 |
| 0 1 0 | 5 5 5 |
| 0 0 1 | 6 6 6 |
| 0 0 0 | 7 7 7 |

For example, if the mobile station 106 successfully received all three data bursts, then the mobile station 106 may transmit the three-tile combination vector "000". The base station 104 may, upon processing the tile combination vector "000", determine that all three data bursts were successfully received. If the mobile station 106 successfully received the first two data bursts but not the third data burst, the mobile station 106 may transmit the tile combination vector "111"; upon receipt and processing of this tile combination vector, the base station 104 may determine that the first two but not the third data burst were successfully received, and the base station 104 may retransmit the third data burst that has not been received successful by the mobile station 106. Similarly, if the mobile station 106 successfully received the second and third data bursts, but not the first data burst, the mobile station 106 may transmit the tile combination vector "444", and the base station 104 may receive this tile combination vector and respond accordingly. While the aggregated ACK/NAK in this example occupied half of an UL channel by using three tiles, other example aggregated ACK/NAK reports may occupy a full UL channel by using six tiles, a third of an UL channel by using two tiles, or a sixth of an UL channel by using one tile.

In another example embodiment, the aggregation of the ACK/NAK reports for data bursts may be achieved by superposition or sharing of an UL channel. The ACK/NAK reports may be aggregated into a single shared UL channel using orthogonal codewords for each of the aggregated ACK/NAK reports. For each ACK/NAK report associated with a data burst in the aggregated report, there may be associated a pair of codewords, one for ACK reporting and another for NAK reporting, as is shown in the following table:

| ACKs and NAKs assignments for superimposed signal reporting | Vector Indices per Tile Tile (0), Tile (1), Tile (2) |
|---|---|
| ACK for $1^{st}$ burst in the aggregation | 0 0 0 |
| NAK for $1^{st}$ burst in the aggregation | 1 1 1 |
| ACK for $2^{nd}$ burst in the aggregation | 2 2 2 |
| NAK for $2^{nd}$ burst in the aggregation | 3 3 3 |
| ACK for $3^{rd}$ burst in the aggregation | 4 4 4 |
| NAK for $3^{rd}$ burst in the aggregation | 5 5 5 |
| ACK for $4^{th}$ burst in the aggregation | 6 6 6 |
| NAK for $4^{th}$ burst in the aggregation | 7 7 7 |

In this example, four ACK/NAK reports may be aggregated by superposition on the same aggregated ACK/NAK report channel. For example, if the base station 104 transmits four bursts to mobile station 106, and the first and fourth burst have not been successfully received, then the mobile station 106 may transmit on the aggregated ACK/NAK report channel the superposition of the tile combinations "111" (for the 1$^{st}$ NAK), "222" (for the 2$^{nd}$ ACK), "444" (for the 3$^{rd}$ ACK) and "777" (for the 4$^{th}$ NAK). The superimposed signal of the tile combinations "111"+"222"+"444"+"777" may be decoded by the base station 104 which determines the reception status of each individual burst. The transmission of four superimposed signals may utilize more energy than transmitting one signal. For better detection and channel estimation and based on available power at the mobile stations 106, 108, 110, the base station 104 may configure each mobile station 106 108 110 to aggregate a number selected from a range of numbers, such as either two, three, or four ACK/NAK reports, per aggregate ACK channel.

The tile combination vector sent via the channel may be orthogonally modulated with quadrature phase-shift keying (QPSK) symbols, for example. The tiles or vector indices, which make up the 8-ary alphabet, may each be represented by eight QPSK symbols, such as by the orthogonal modulation index shown in the following table. In the following table, the vector index shown in the left-hand column corresponds to one of the three vector indices shown in the right-hand column of the previous table:

| Vector index | QPSK symbols (codewords) |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

For example, the codeword identified as vector index "0" may be represented by the eight QPSK symbols "P0, P1, P2, P3, P0, P1, P2, P3". In an example embodiment, P0 may correspond to a forty-five degree phase shift, P1 may correspond to a one-hundred and thirty-five degree phase shift, P2 may correspond to a negative forty-five degree phase shift, and P3 may correspond to a negative one-hundred and thirty-five degree phase shift.

According to another example embodiment, the vector indices may be represented by codewords shown in the following table:

| Vector index | QPSK symbols (codewords) |
| --- | --- |
| 0 | P0, P0, P0, P0, P0, P0, P0, P0 |
| 1 | P2, P2, P2, P2, P2, P2, P2, P2 |
| 2 | P1, P1, P1, P1, P1, P1, P1, P1 |
| 3 | P3, P3, P3, P3, P3, P3, P3, P3 |
| 4 | P0, P1, P2, P3, P0, P1, P2, P3 |
| 5 | P2, P3, P0, P1, P2, P3, P0, P1 |
| 6 | P1, P2, P3, P0, P1, P2, P3, P0 |
| 7 | P3, P0, P1, P2, P3, P0, P1, P2 |

In this example, the codeword identified as vector index "0" may be represented by the eight "P0" QPSK symbols.

Figure 2:
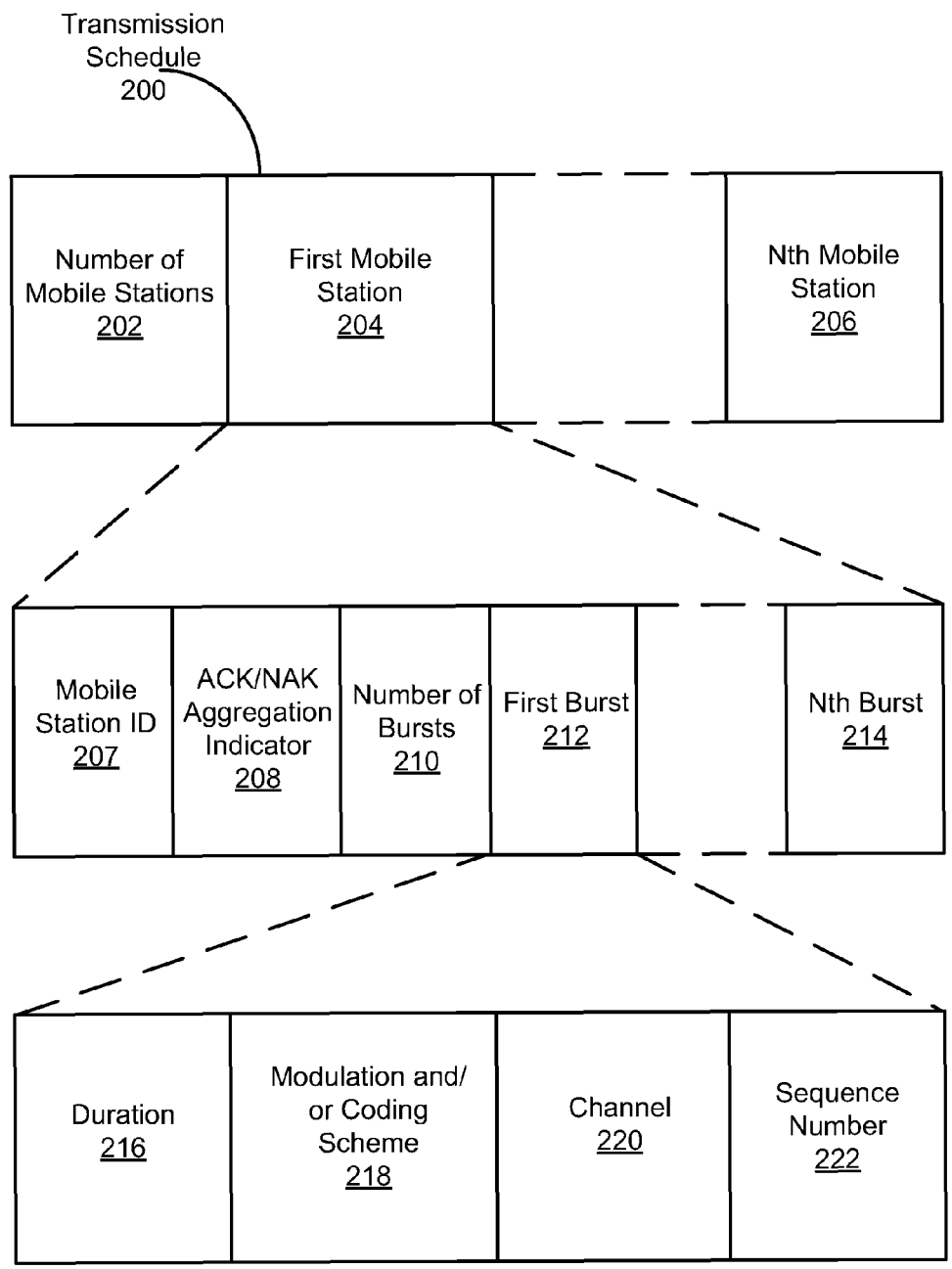
FIG. 2 is a block diagram of a transmission schedule according to an example embodiment.

FIG. 2 is a block diagram of a transmission schedule 200 according to an example embodiment. This figure schematically presents some of the fields included in MAPs that may be used for data scheduling, without showing the actual allocation of data bursts. The transmission schedule 200 may include, for example, a downlink (DL) HARQ Chase burst information element (IE), or a DL HARQ Chase sub-burst IE. The transmission schedule 200 may be sent by the base station 104 to the mobile stations 106, 108, 110. The transmission schedule 200 may indicate how many mobile stations 106, 108, 110 a flow of data bursts may be directed to, how many data bursts each mobile station 106, 108, 110 may receive, how the mobile stations 106, 108, 110 should aggregate their ACKs and/or NAKs, and may provide information about each data burst in the flow.

The transmission schedule 200 may include a number of mobile stations field 202, according to an example embodiment. The number of mobile stations field 202 may indicate the number of mobile stations 106, 108, 110 to which data bursts will be sent during the flow. The transmission schedule 200 may also include fields for each mobile station 106, 108, 110, such as a first mobile station field 204 through an Nth mobile station field 206; 'N' may correspond to the number of mobile stations 106, 108, 110 indicated in the number of mobile stations field 202.

Each mobile station field, such as the first mobile station field 204, may include subfields. The mobile station field may include a mobile station ID field 207, which may identify one of the mobile stations 106, 108, 110, for example. The mobile station field may also include an ACK/NAK aggregation indicator 208, according to an example embodiment. The ACK/NAK aggregation indicator 208 may indicate a number of ACKs and/or NAKs for data bursts which should be aggregated into each channel (which may be an UL ACK channel). The ACK/NAK aggregation indicator 208 may be updated by the base station 104 for each transmission schedule 200. For example, the base station 104 may determine the number of ACKs and/or NAKs which should be aggregated based on the uplink channel quality before sending each transmission schedule 200. The ACK/NAK aggregation indicator 208 may have a range of possible values, such as between one and three. For example, the base station 104 may send a transmission schedule indicating that a given mobile node 106 should aggregate three ACKs and/or NAKs if the uplink channel quality is high, two ACKs and/or NAKs if the uplink channel quality is medium, and only one (i.e., no aggregation) if the uplink channel quality is low. Updating the ACK/NAK aggregation indicator 208 dynamically, such as with each transmission schedule 200, or periodically, after every 'n' transmission schedules 200, may allow the base station 104 to vary the mobile stations' 106, 108, 110 aggregation of ACKs and/or NAKs based on varying uplink channel conditions.

Each mobile station field, such as the first mobile station field 204, may include a number of bursts subfield 210. The number of bursts field 210 may indicate the number of data bursts which will be sent to the given mobile station 204 during the flow.

Each mobile station field, such as the first mobile station field 204, may also include a number of data burst subfields corresponding to the number of data bursts indicated in the number of bursts subfield 210. For example, the first mobile station field 204 may include a first burst subfield 212 through an Nth burst subfield 214, with 'N' corresponding to the number of data bursts indicated in the number of bursts subfield 210.

Each burst subfield, such as the first burst subfield 212, may include additional subfields. For example, the first burst subfield 212 may include a duration subfield 216. The duration subfield 216 may indicate a duration of the data burst, such as in time slots, according to an example embodiment. According to another example embodiment, the duration subfield 216 may indicate the channel resources allocated to the data burst, such as bandwidth and/or time.

The first burst subfield 212 may also include a modulation and/or coding scheme subfield 218. The modulation and/or coding scheme subfield 218 may indicate a modulation scheme and/or a coding scheme which the base station 104 may use to transmit the data burst to the mobile station 106. The mobile station 106 may use the information in the modulation and/or coding scheme subfield 218 to demodulate and/or decode the data burst. The first burst subfield 212 may also include a channel subfield 220, which may indicate a channel via which the data burst may be sent. The mobile station 106 may have access to multiple, such as sixteen, logical channels, and the channel subfield 220 may identify the channel via which the data burst may be transmitted. The first burst subfield 212 may also include a sequence number subfield 222, which may indicate a sequence number for the data burst. The indicated sequence number may be included in the data burst, and may be used to distinguish the data burst from other data bursts. In an example embodiment, the sequence number includes one bit. Other burst subfields may include subfields corresponding to those described with reference to the first burst subfield 212.

According to an example embodiment, the following syntax may be used to generate the transmission schedule:

data bursts. For each of the mobile stations 106, 108, 110, the ACK/NAK aggregation indicator subfield 208 for each mobile station 106, 108, 110 may indicate that the mobile stations 106, 108, 110 may each send an aggregated ACK/NAK report for two data bursts. The number of bursts subfield 210 may indicate that mobile station 106 may receive two data bursts, mobile station 108 may receive two data bursts, and mobile station 110 may receive one data burst.

The mobile stations 106, 108, 110 may compute the offset positions or ACK/NAK channels of their respective aggregated ACK/NAK reports based on the transmission schedule, according to an example embodiment. The aggregated ACK/NAK reports may begin after a defined delay period after the last data burst, according to an example embodiment. The first aggregated ACK/NAK report may be considered to be sent in the first offset position or ACK/NAK channel (such as an UL ACK channel), the second aggregated ACK/NAK report in the second offset position or ACK/NAK channel (such as an UL ACK channel), and so on.

The offset positions of the aggregated ACK/NAK reports may be calculated by dividing the number of data bursts to be sent to a given mobile station by the number indicated in the ACK/NAK aggregation indicator 208 and rounding up, according to an example embodiment. In this example, the

| Syntax | Size | Notes |
|---|---|---|
| DL HARQ Chase burst IE ( ) { | — | — |
| N_CID | 4 bits | Number of CIDs (mobile stations) |
| For (I = 0; I < N_CID; I++) { | — | — |
| RCID_IE ( ) | Variable | Identity of mobile station |
| Nagg | 2 bit | 00 = 1 ACK/NAK per UL ACK channel<br>01 = 2 ACKs/NAKs per UL ACK channel<br>10 = 3 ACKs/NAKs per UL ACK channel<br>11 = Reserved |
| N_burst | 4 bits | Number of data bursts |
| For (j = 0; j < N_burst; j++) { | — | — |
| Duration | 10 bits | Duration of data burst in slots |
| Burst DIUC indicator | 1 bit | If Burst DIUC Indicator is 1, this may indicate that DIUC is explicitly assigned for this burst. Otherwise, this burst may use the same DIUC as the previous data burst. If j is 0, then this indicator may be 1. |
| Reserved | 1 bit | |
| If (burst DIUC indicator == 1) { | — | — |
| DIUC | 4 bits | — |
| Repetition coding indication | 2 bits | 0b00 - No repetition coding<br>0b01 - Repetition coding of 2 used<br>0b10 - Repetition coding of 4 used<br>0b11 - Repetition coding of 6 used |
| } | | |
| ACID | 4 bits | |
| AI_SN | 1 bit | |
| } | | |
| } | | |
| } | | |

60

Figure 3:
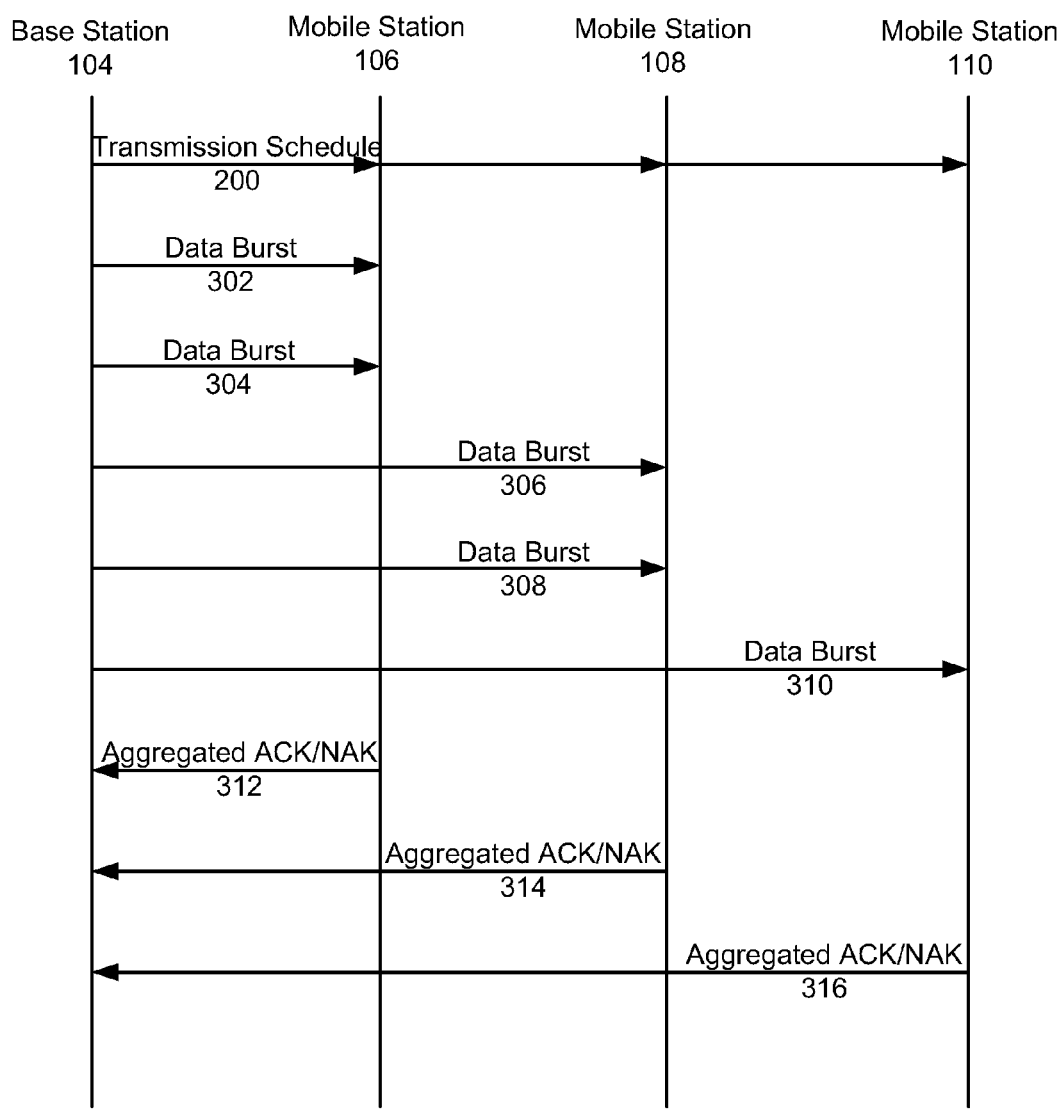
FIG. 3 is a vertical-time sequence diagram showing an exchange of transmissions between the base station and the mobile stations according to an example embodiment.

FIG. 3 is a vertical-time sequence diagram showing the exchange of transmissions between the base station 104 and the mobile stations 106, 108, 110 according to an example embodiment. In this example, the base station 104 may send the transmission schedule 200 to the three mobile stations 106, 108, 110. The number of mobile stations field 202 may indicate that three mobile stations 106, 108, 110 will receive mobile station 106 may compute that because it will receive two data bursts and will aggregate two ACKs and/or NAKs for two data bursts in the aggregated ACK/NAK report (two divided by two), the mobile station 106 may transmit its aggregated ACK/NAK report in the first offset position or ACK/NAK channel, and the aggregated ACK/NAK report will occupy one ACK/NAK channel. Similarly, the mobile station 108 may compute that because it will receive two data bursts and will aggregate two ACKs and/or NAKs for two data bursts in the aggregated ACK/NAK report (two divided by two), the mobile station 108 may transmit its aggregated ACK/NAK report in the second offset position or ACK/NAK channel, and the aggregated ACK/NAK report will occupy one ACK/NAK channel. The mobile station 110 may compute that because it will receive one data burst and will aggregate one ACK or NAK for one data burst in the aggregated ACK/NAK report (one divided by two, rounded up), the mobile station 110 may transmit its aggregated ACK/NAK report in the third offset position or ACK/NAK channel, and the aggregated ACK/NAK report will occupy one ACK/NAK channel.

After or together with transmitting the transmission schedule 200 to the mobile stations 106, 108, 110, the base station 104 may transmit a data burst 302 and a data burst 304 to the mobile station 106. Upon receipt of these data bursts 302, 304, the mobile station 106 may determine whether each of the data bursts 302, 304 was successfully received.

The base station 104 may also transmit a data burst 306 and a data burst 308 to the mobile station 108. Upon receipt of these data bursts 306, 308, the mobile station 108 may determine whether each of the data bursts 306, 308 was successfully received. The base station 104 may also transmit a data burst 310 to the mobile station 110, and the mobile station 110 may determine whether the data burst 310 was successfully received.

According to an example embodiment, the mobile stations 106, 108, 110 may begin sending aggregated ACK/NAK reports to the base station 104 after the base station 104 has finished sending the data bursts 302, 304, 306, 308, 310. The aggregated ACK/NAK reports may each indicate whether each of the plurality of data bursts 302, 304, 306, 308, 310 was successfully received by the respective mobile station 106, 108, 110.

For example, the mobile station 106 may send an aggregated ACK/NAK report 312 in the first offset position or ACK/NAK channel indicating whether the mobile station 106 successfully received each of the data bursts 302, 304. The mobile station 108 may send an aggregated ACK/NAK report 314 in the second offset position or ACK/NAK channel indicating whether the mobile station 108 successfully received each of the data bursts 306, 308. The mobile station 110 may send an aggregated ACK/NAK report 316 in the third offset position or ACK/NAK channel indicating whether the mobile station 110 successfully received the data burst 310. The base station 104 may receive each of the aggregated ACK/NAK reports 312, 314, 316. Each of the aggregated ACK/NAK reports 312, 314, 316 may be sent via its own channel, such as an UL channel, according to an example embodiment. The base station 104 may determine whether to retransmit any of the data bursts 302, 304, 306, 308, 310 based on the aggregated ACK/NAK reports 312, 314, 316.

Figure 4:
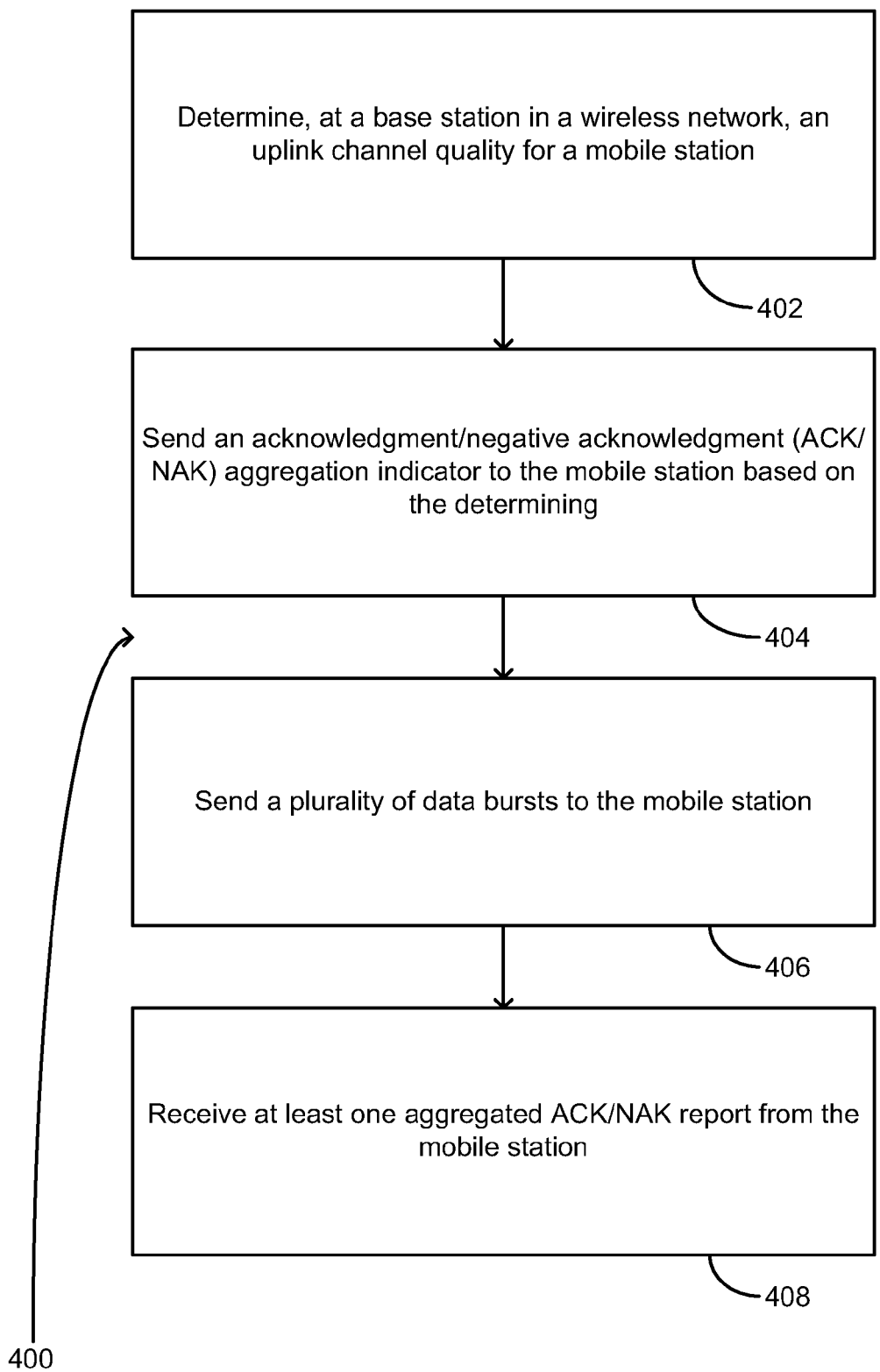
FIG. 4 is a flowchart showing a method according to an example embodiment.

FIG. 4 is a flowchart showing a method 400 according to an example embodiment. According to this example the method 400 may include determining, at a base station 104 in a wireless network 102, an uplink channel quality for a mobile station 106, 108, 110 (402). The determining (402) may include, for example, determining a distance of the mobile station 106, 108, 110 from the base station 104. According to another example, the determining (402) may include determining a received signal strength of an uplink ACK/NAK channel for the mobile station 106, 108, 110.

The method 400 may also include sending an acknowledgment/negative acknowledgment (ACK/NAK) aggregation indicator to the mobile station 106, 108, 110 based on the determining. According to one example, the ACK/NAK indicator may be included in a transmission schedule which includes a schedule of data bursts which will be sent to the mobile station 106, 108, 110. According to another example, the ACK/NAK aggregation indicator may indicate a number of the plurality of data bursts to be acknowledged or negatively acknowledged by the mobile station 106, 108, 110 per the at least one aggregated ACK/NAK report.

The method 400 may also include sending a plurality of data bursts to the mobile station 106, 108, 110 (406). The method 400 may also include receiving at least one aggregated ACK/NAK report from the mobile station 106, 108, 110 (408). According to an example embodiment, the at least one aggregated ACK/NAK report may include a plurality of ACK/NAK reports corresponding to the plurality of data bursts, each of the plurality of ACK/NAK reports indicating whether each of at least two of the plurality of data bursts, to which the plurality of ACK/NAK reports correspond, was successfully received or not. According to another example embodiment, an aggregated ACK/NAK report may be received via a single channel. According to another example, the aggregated ACK/NAK may include a tile combination vector.

According to another example embodiment, receiving the at least one aggregated ACK/NAK report may include receiving a plurality of aggregated ACK/NAK reports. Each of the plurality of aggregated ACK/NAK reports may indicate whether a number of the plurality of data bursts was successfully received or not. The number may be based on the ACK/NAK aggregation indicator. In an example embodiment, the number may be at least two.

According to another example embodiment, the receiving the at least one aggregated ACK/NAK report may include receiving a plurality of ACK/NAK reports superimposed onto a single ACK/NAK report channel.

According to another example, uplink channel qualities may be determined for a plurality of mobile stations 106, 108, 110. ACK/NAK aggregation indicators may indicate a number of ACK/NAKs which each of the plurality of mobile stations 106, 108, 110 should aggregate per an aggregated ACK/NAK channel report. At least one data burst may be sent to each of the plurality of mobile stations 106, 108, 110. At least one aggregated ACK/NAK may be received from each of the plurality of mobile stations 106, 108, 110.

According to another example, each of the plurality of data bursts may include a plurality of data blocks. Each of the plurality of data blocks may include a cyclic redundancy code (CRC). In this example, the at least one aggregated ACK/NAK report may include an ACK/NAK corresponding to each of the data blocks.

Figure 5:
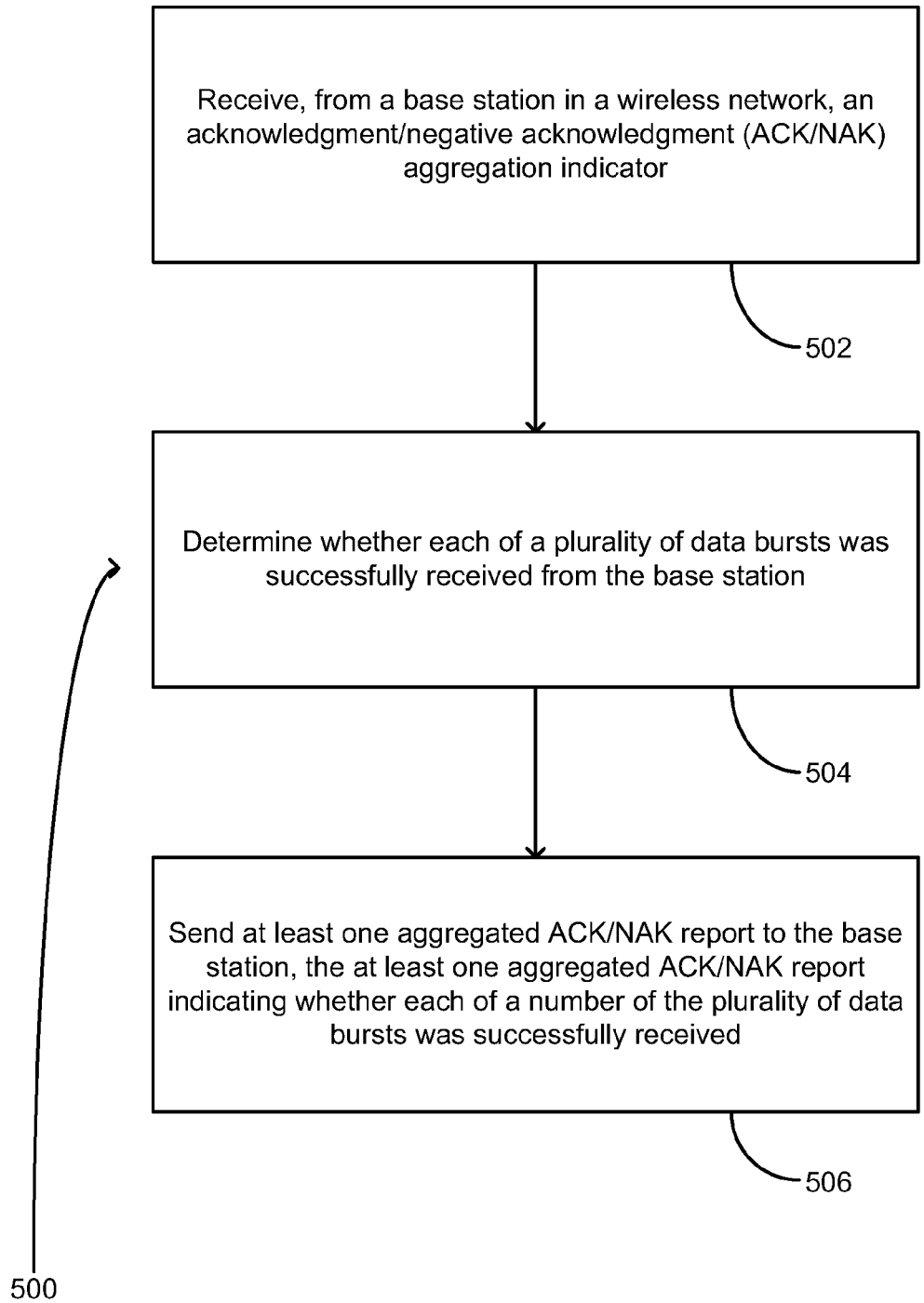
FIG. 5 is a flowchart showing a method according to an example embodiment.

FIG. 5 is a flowchart showing a method 500 according to an example embodiment. According to this example, the method 500 may include receiving, from a base station 104 in a wireless network 102, an acknowledgment/negative acknowledgment (ACK/NAK) aggregation indicator (502). The ACK/NAK aggregation indicator may, for example, be included in a transmission schedule 200 which includes a schedule of data bursts which will be sent by the base station 104.

The method 500 may further include determining which of a plurality of data bursts were successfully received from the base station 104 (504). The method 500 may further include sending at least one aggregated ACK/NAK report to the base station 104 (506).

The method 500 may further include aggregating a number of ACK/NAKs into the at least one aggregated ACK/NAK report. The at least one aggregated ACK/NAK report may include the number of ACK/NAKs, which each may correspond to one of the plurality of data bursts and indicate whether its corresponding data burst was successfully received. The number may be based on the ACK/NAK aggregation indicator.

According to an example embodiment, an aggregated ACK/NAK report may be sent via a single channel. According to another example embodiment, the aggregated ACK/NAK report may include a tile combination vector. According to another example embodiment, the at least one aggregated ACK/NAK report may indicate whether each of the plurality of data bursts, such as the data bursts that were aggregated, were successfully received. A number of the plurality of data bursts which the aggregated ACK/NAK report indicates were or were not successfully received may be at least two, and may be based on the ACK/NAK aggregation indicator. According to another example embodiment, the at least one aggregated ACK/NAK report may include a plurality of superimposed ACK/NAK reports each indicating whether one of the plurality of data bursts was successfully received.

According to another example embodiment, the method 500 may further comprise aggregating a number of ACK/NAKs into the at least one aggregated ACK/NAK report. In this example, each ACK/NAK may correspond to one of the plurality of data bursts. The number may be based on the ACK/NAK aggregation indicator. The aggregated ACK/NAK may include each of the number of ACK/NAKs.

Figure 6:
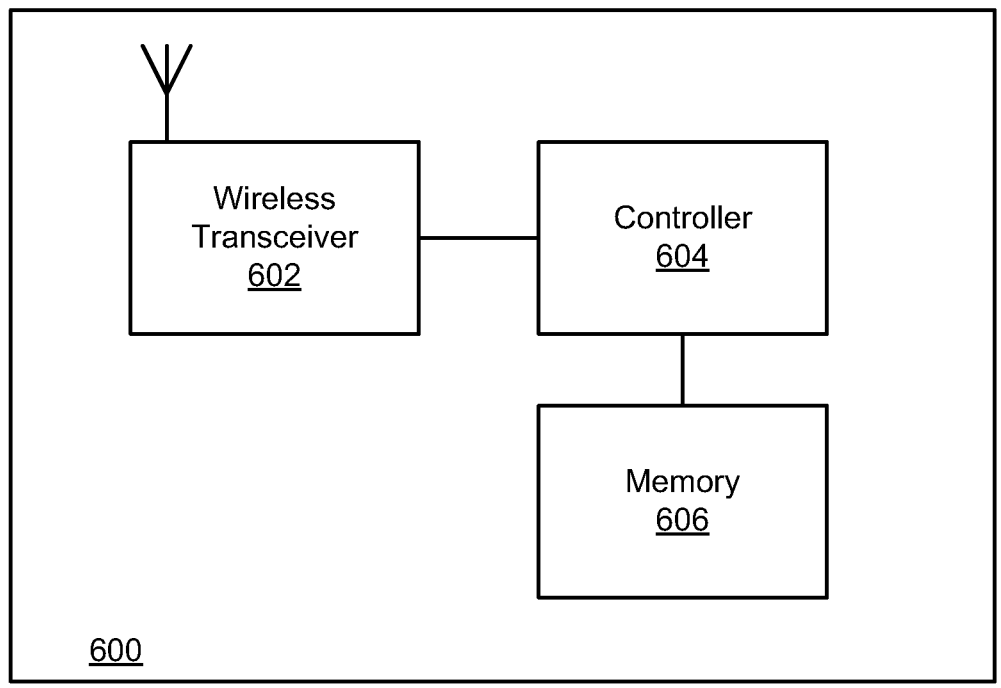
FIG. 6 is a block diagram showing an apparatus according to an example embodiment.

FIG. 6 is a block diagram showing an apparatus 600 according to an example embodiment. The apparatus (e.g. base station 104 or mobile node 106, 108, 110) may include, for example, a wireless transceiver 602 to transmit and receive signals, a controller 604 to control operation of the station and execute instructions or software, and a memory 606 to store data and/or instructions.

Controller 604 may be programmable and capable of executing software or other instructions stored in memory or on other computer media to perform the various tasks and functions described above, such as one or more of the tasks or methods described above.

In addition, a storage medium may be provided that includes stored instructions, when executed by a controller or processor that may result in the controller 604, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method performed by a mobile station in a wireless network, the method comprising:
receiving two or more separate data bursts;
receiving an acknowledgment/negative acknowledgment (ACK/NAK) aggregation indicator, wherein the ACK/NAK aggregation indicator indicates to the mobile station how many separate data bursts are to be acknowledged or negatively acknowledged by the mobile station in an aggregated ACK/NAK report; and subsequent to receiving the two or more separate data bursts, sending one of:

(a) one aggregated ACK/NAK report comprising a plurality of ACK/NAKs, each ACK/NAK corresponding to one of the two or more separate data bursts and indicating whether each one of the two or more separate data bursts was successfully received or not, or (b) one aggregated ACK/NAK report comprising one ACK/NAK corresponding to the two or more separate data bursts, wherein the one ACK/NAK indicates whether the two or more separate data bursts were successfully received or not.

2. The method of claim 1, wherein the ACK/NAK aggregation indicator is included in a transmission schedule which includes a schedule of one or more separate data bursts which will be sent by a base station.

3. A mobile station of a wireless network, the mobile station comprising:

a receiver configured to:

receive two or more separate data bursts; and receive an acknowledgment/negative acknowledgment (ACK/NAK) aggregation indicator, wherein the ACK/NAK aggregation indicator indicates to the mobile station how many separate data bursts are to be acknowledged or negatively acknowledged by the mobile station in an aggregated ACK/NAK report; and a transmitter configured to, subsequent to receiving the two or more separate data bursts, transmit one of:

(a) one aggregated ACK/NAK report comprising a plurality of ACK/NAKs, each ACK/NAK corresponding to one of the two or more separate data bursts and indicating whether each one of the two or more separate data bursts was successfully received or not, or (b) one aggregated ACK/NAK report comprising one ACK/NAK corresponding to the two or more separate data bursts, wherein the one ACK/NAK indicates whether the two or more separate data bursts were successfully received or not.

4. The mobile station of claim 3, wherein the ACK/NAK aggregation indicator is included in a transmission schedule which includes a schedule of one or more separate data bursts which will be sent by a base station.

5. A non-transitory computer readable storage medium comprising executable code stored thereon that, when executed by a processor, causes an apparatus to at least:

receive two or more separate data bursts;

receive an acknowledgment/negative acknowledgment (ACK/NAK) aggregation indicator, wherein the ACK/NAK aggregation indicator indicates to the apparatus how many separate data bursts are to be acknowledged or negatively acknowledged by the apparatus in an aggregated ACK/NAK report; and subsequent to receiving the two or more separate data bursts, transmit one of:

(a) one aggregated ACK/NAK report comprising a plurality of ACK/NAKs, each ACK/NAK corresponding to one of the two or more separate data bursts and indicating whether each one of the two or more separate data bursts was successfully received or not, or (b) one aggregated ACK/NAK report comprising one ACK/NAK corresponding to the two or more separate data bursts, wherein the one ACK/NAK indicates whether the two or more separate data bursts were successfully received or not.

6. The non-transitory computer readable storage medium of claim 5, wherein the ACK/NAK aggregation indicator is included in a transmission schedule which includes a schedule of one or more separate data bursts which will be sent by a base station.

\* \* \* \* \*